June 3, 1958 W. F. HORSTING, SR 2,837,032
FILTER FOR USE WITH PERIODIC SUCTION PUMPS
Filed July 31, 1957 3 Sheets-Sheet 1

Inventor
William F. Horsting Sr.
By Ira Milton Jones
Attorney

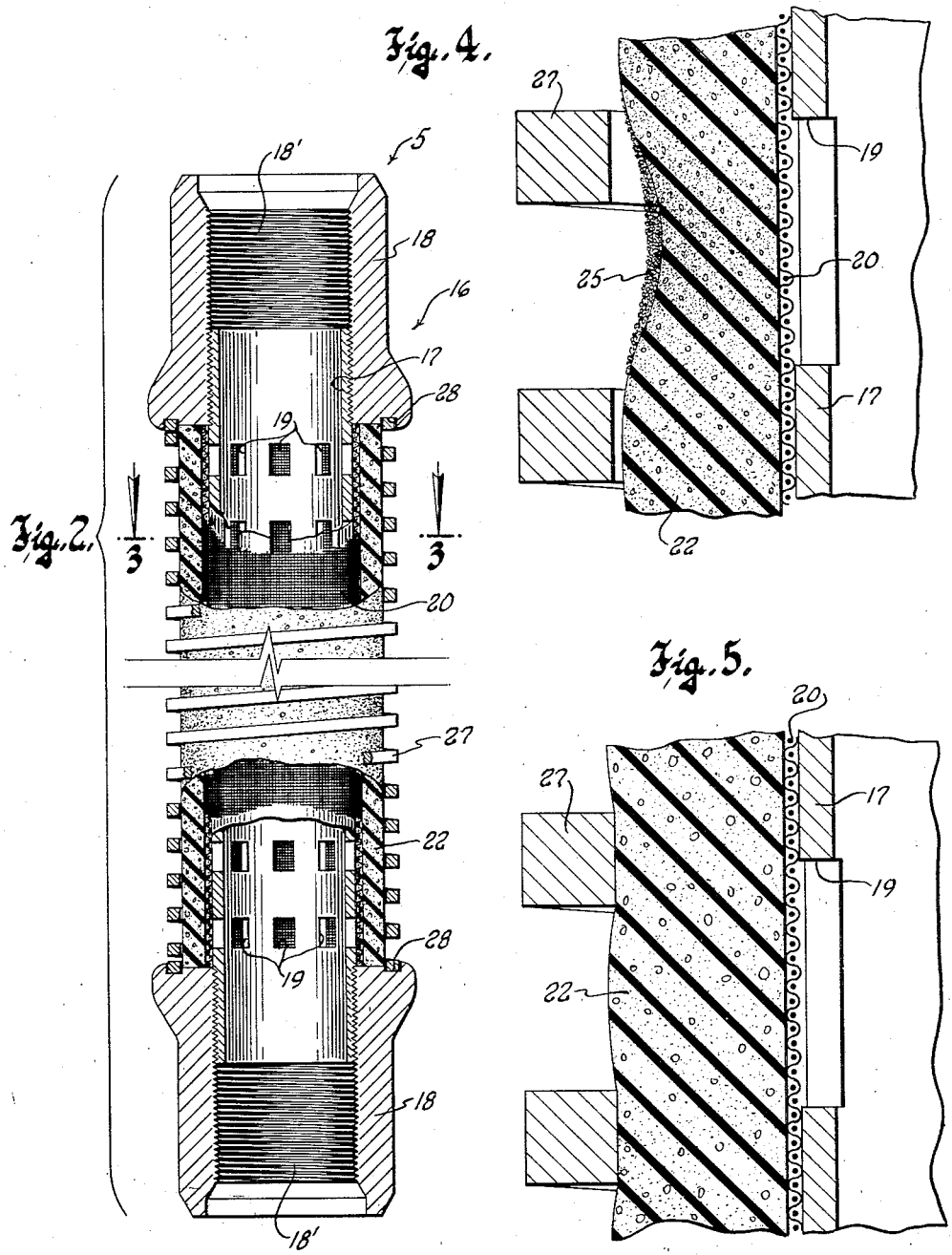

June 3, 1958   W. F. HORSTING, SR   2,837,032
FILTER FOR USE WITH PERIODIC SUCTION PUMPS
Filed July 31, 1957   3 Sheets-Sheet 3

Inventor
William F. Horsting Sr.
By Ira Milton Jones
Attorney

United States Patent Office 2,837,032
Patented June 3, 1958

2,837,032

FILTER FOR USE WITH PERIODIC SUCTION PUMPS

William F. Horsting, Sr., Wilmette, Ill., assignor of one-sixth to Ira Milton Jones, Milwaukee, Wis.

Application July 31, 1957, Serial No. 675,293

6 Claims. (Cl. 103—220)

This invention relates to filters and refers more particularly to filters for use with reciprocating pumps which produce periodic suction impulses, to filter solid abrasive particles, such as sand, from the liquid being pumped before it is drawn into the suction pipe of the pump.

Although the filter unit of this invention may be used to good advantage on pumps pumping water and other liquids, it was developed primarily for use with oil well pumps. There are many thousands of oil wells in the United States that are drilled and completed in a horizon of unconsolidated sand, that is, a soft crumbly sandstone. In such wells, the sand does not precipitate to the bottom of the well, but instead remains in suspension and is pumped up with the oil. As a result, the valve seats and ball checks of the pumps, as well as the other working parts thereof, become worn and useless long before they would if the abrasive sand were filtered from the oil before it entered the pumps. Oil companies have spent huge sums of money in trying to find a suitable solution to this problem, but heretofore there has been no satisfactory way of preventing the entry of the sand into the suction pipe of the pump.

Filters of all kinds had been tried and discarded. In those instances, heretofore, where the filter succeeded in keeping the sand from entering the suction pipe, the useful life of the filter was far too short to warrant its use. The frequent replacement of clogged, inoperative filters is as objectionable as the practice of periodically "pulling the well" to replace worn valve seats, ball checks and other parts that become damaged by the abrasive sand. In either case, the cost of the actual work involved in "pulling the well" is high, to say nothing of the loss in production.

It follows, therefore, that a filter which will successfully prevent the sand from entering the suction pipe of the pump without appreciably affecting the rate of flow and which is self-cleaning, solves a very serious problem of long standing.

The present invention achieves this objective, and does so by utilizing an inherent characteristic of the reciprocating type pump, namely, its periodic suction pulsations, to prevent clogging of the filter.

With this in mind, it is an object of the present invention to provide a filter unit wherein the filter element, in its entirety, comprises a wall of soft but resilient porous rubber-like foam material interposed between the mouth of the suction pipe and the liquid to be pumped, and so supported that it and its pores are contracted with each suction impulse and return to their normal size between successive suction impulses. This "breathing" of the filter element, it is believed, accounts for the self-cleaning quality possessed by the filter unit of this invention, an attribute which experience and extensive tests have shown it to have.

The material of which the filter element is made is, of course, not new per se, being available upon the market and known as foam rubber or foam neoprene. This material has a high degree of resilience and its interstitial pores are generally smaller than sand, and, in this respect, it distinguishes markedly from sponge rubber and the various synthetic sponge-like materials, since the pore size of those materials normally is far too large for the purposes of this invention.

The instant application is a continuation-in-part of the copending application Serial No. 565,612, filed February 15, 1956, which in turn, was a continuation-in-part of application Serial No. 484,509, filed January 27, 1955, both of which applications are now abandoned. Although these earlier filed applications stressed certain structural characteristics as important to the success of the invention, which experience has shown not to be as essential as first thought, the "breathing" of the filter element in response to the periodic suction pulsations of the pump has always been recognized as vitally significant.

To assure this essential "breathing" of the filter element and unimpaired operativeness of the filter unit, the resilience of the material of which the filter element is formed and its wall thickness must be correctly related to the maximum suction produced by the pump. If the material is too stiff it will not respond properly to the suction pulsations; and if it has the proper resilience and its wall thickness is not sufficient, stoppage of the flow is likely due to excessive compaction of the filter wall and complete collapse of its pores under maximum pump suction. For any given maximum pump suction, the degree of resilience of the filter material and the minimum wall thickness of the filter element can be readily determined by those skilled in this art once the invention is fully understood.

It is, therefore, another object of this invention to provide a filter unit of the character described which may be readily constructed to work satisfactorily with any pump of the type which produces periodic suction impulses, regardless of the magnitude of the suction it develops.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is essentially a side view on an enlarged scale of the filter unit per se, the medial portion of the unit being broken away and its end portions being illustrated in longitudinal section;

Figure 4 is a greatly enlarged fragmentary sectional view on a longitudinal plane through a portion of the filter, illustrating the manner in which the wall of the filter element contracts to reduce the size of its pores during the suction stroke of the pump;

Figure 5 is a view similar to Figure 4 but illustrating the condition of the filter element between successive suction impulses;

Referring now particularly to the accompanying drawings, the numeral 5 designates generally the entire filter unit of this invention, and which, in use, is secured to the lower end of the suction pipe or tube 6 of the pump 7 to filter sand and other abrasive solid particles from the liquid before it enters the pump.

Figure 1:
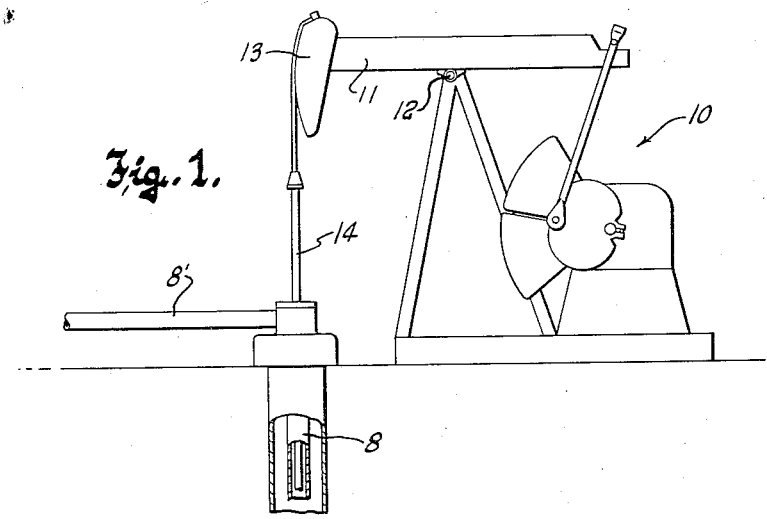
Figure 1 illustrates an oil well equipped with the filter unit of this invention.
Figure 3:
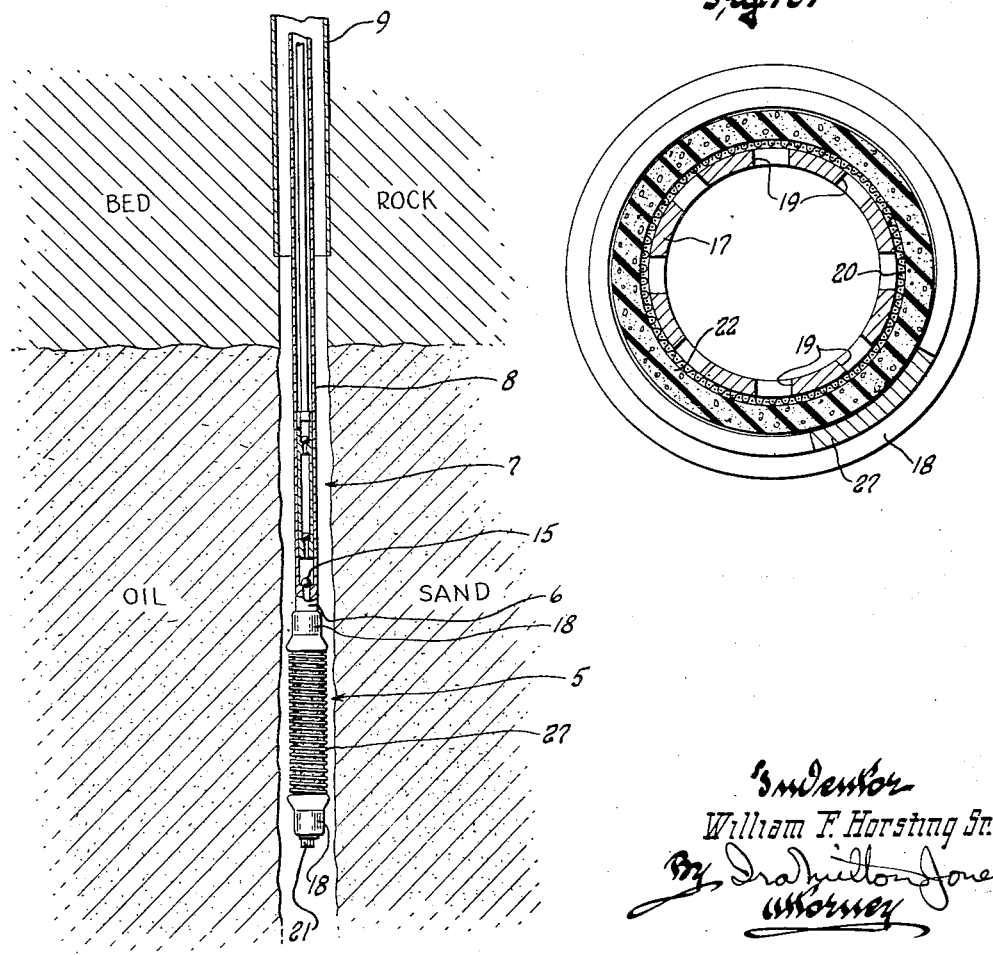
Figure 3 is a cross sectional view through the filter unit, taken on the plane of the line 3—3 in Figure 2.

Since the filter unit of this invention was developed primarily for use with oil well pumps, the installation illustrated in Figure 1, though generally representative of the different uses to which the invention may be put, is that of an operating oil well. In such wells, the pump 7 is located in the lower end of a tube 8 which extends down into the well, the upper portion of which at least down to bed-rock, is lined by a casing 9. The suction pipe 6 in effect forms a continuation of the tube 8, and the plunger of the pump is driven by a power unit indicated generally by the numeral 10.

The power unit is, of course, mounted on the surface and includes a rocker arm 11 fulcrumed to rock about a pivot 12, and an engine or other suitable prime mover operating through a gear reduction unit to rock the arm on its fulcrum. The outer end 13 of the arm, which is known as the horse head, is connected to a rod 14 which extends down through the tube 8 and is joined to the plunger of the pump to reciprocate the same as the horse head moves up and down.

During the upstroke of the pump plunger, oil is drawn into the suction pipe 6 through the filter unit 5 and past a check valve 15. On the downstroke, the check valve 15 is closed and the valves in the pump plunger open so that the liquid above the valve 15 moves into the pump to be lifted on the next successive upstroke, and eventually discharged through a pipe 8'.

Through the foregoing rather detailed description of the well and pump unit may not be necessary for a full understanding of the invention, it has been included to assure complete understanding of the fact that the filter unit of this invention finds useful purpose only in association or combination with a pump which produces periodic suction pulsations, and normally such a pump is of the reciprocating type.

The body of the filter unit 5, which is designated generally by the numeral 16, consists of a rigid metal tube 17 and coupling member 18 threaded on the ends of the tube. Between the inner facing ends of the coupling members, the tube 17 has a large number of relatively large holes 19, and encircling the tube 17 and hence covering the holes 19 is a wire screen 20 of relatively fine mesh on the order of 1/16 of an inch. The body, therefore, has a perforate intermediate portion and imperforate end portions, and broadly the screen 20 may be considered a part of the body.

Both coupling members 18 which provide the imperforate end portions of the body 16 are internally threaded, as at 18', and one of them is threaded onto the lower end of the suction pipe of the pump so that the body forms a continuation of this pipe. The other coupling member has a pipe plug 21 (see Figure 1) secured therein if only one filter unit is used in the installation. Obviously, though, in lieu of the plug 21 a short length of pipe (not shown) may be threaded into the lower coupling member 18 to allow a second filter unit to be connected in tandem with the one secured to the suction pipe, but in any event the lower end of the body must be closed so that the only entry into the body is through the holes 19.

Attention is directed to the fact that the relatively large size of the holes 19 and their large number, assure that liquid may flow freely into the interior of the body in response to pump produced suction manifested therein.

Embracing the perforate intermediate portion of the body, namely, that part of the tube 17 between the coupling members 18 and the wire mesh screen 20 thereon, is a sleeve 22 of soft resilient porous rubber-like foam material. This sleeve is the actual filter element and for use in oil wells is made of foam neoprene. For pumping water and many other liquids, the sleeve material may be foam rubber. In either case, it is essential that the wall of the sleeve be porous throughout and that the pores thereof be of a size smaller than sand.

Figure 6:
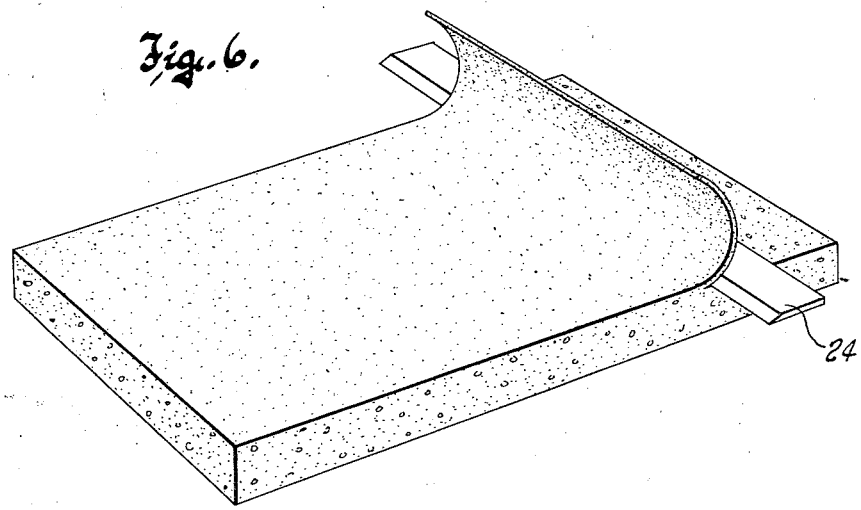
Figure 6 is a perspective view to illustrate one way in which the substantially non-porous surface skin of a sheet of molded rubber-like foam material may be removed to render the same suitable for use as the filter medium in the filter unit of this invention.
Figure 7:
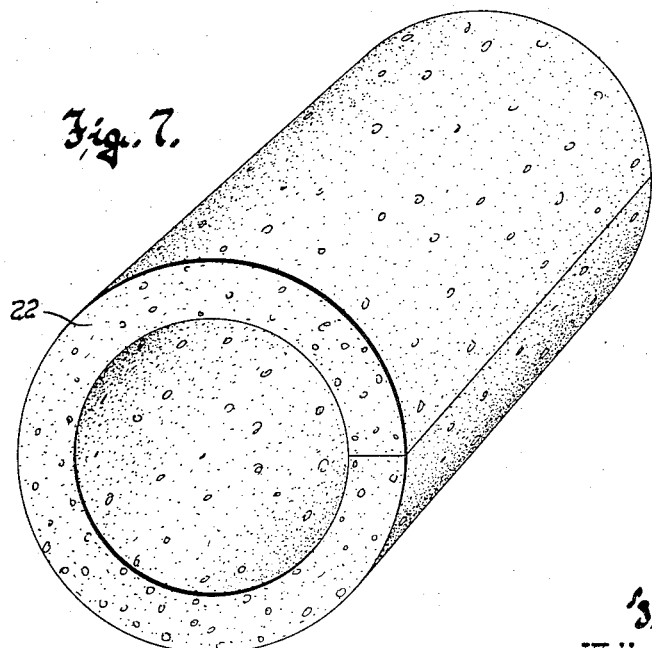
Figure 7 is a perspective view of the filter sleeve per se.

Since the sleeve is best made by rolling up a piece of sheet material and securing the edges thereof together, and since foam rubber and foam neoprene in sheet form is usually molded, it is necessary to cut off the non-porous outer skin from the molded sheet before it can be used for the filter sleeve. The manner in which this is done forms no part of this invention, but Figure 6 illustrates one way in which it could be done, by means of a skiving knife 24. After the sheet is thus prepared to assure uniform porosity throughout, it is rolled into a tube, as shown in Figure 7, and the edges thereof secured together by any suitable adhesive.

The inside diameter of the filter sleeve is preferably slightly less than the outside diameter of the wire mesh screen 20 which encircles the perforated tube 17, so that when in position the porous filter sleeve hugs and embraces the body. The axial length of the sleeve is such that in its normal free condition the ends thereof abut the shoulders provided by the inner ends of the coupling members.

The resilience of the material of which the sleeve is made, and the wall thickness of the sleeve are important factors. As to the former, the resilience which characterizes commercial foam rubber and foam neoprene has been found to be entirely suitable, and since this material is available upon the open market, further definition of the degree of resilience is deemed unnecessary for those skilled in the art to practice this invention.

As to the thickness of the sleeve wall it is the minimum which is important. It must be great enough to assure that during operation, the maximum suction manifested inside the sleeve by the pump will not compact the sleeve wall to such an extent that its pores will be collapsed and thus prevent the liquid from flowing through the sleeve and into the hollow body.

To appreciate the significance of this fact, it should first be understood that in the operation of the filter unit, the filter sleeve breathes with the successive periodic suction pulsations of the pump. This breathing of the sleeve is portrayed by a comparison of Figures 4 and 5. As shown in Figure 4, with each suction impulse, at least those portions of the sleeve opposite the holes 19, are partially compacted. During this partial compaction of the sleeve wall, the inner surface of the sleeve is drawn tightly against the wire mesh which prevents it from being pulled into the holes 19, while the outer surface of the sleeve assumes an undulated shape.

When the minimum wall thickness of the sleeve is correct and sufficient, the extent of this compaction produced by the maximum suction of the pump still leaves the pores of the sleeve wall open enough to permit liquid to flow therethrough, but nevertheless so reduces the size of the pores that sand cannot be forced through the filter wall by the liquid. This necessary porosity is assured when the minimum wall thickness of the sleeve is sufficient despite the fact that the sand and other solid particles which accumulate on the exterior of the sleeve, as at 25 in Figure 4, may actually close off flow into the sleeve portions directly opposite the holes 19. Any such blocking of flow into the filter wall would be localized directly over the holes 19. Hence, as long as the inner portion of the sleeve remains porous, flow will continue.

Even though the sand may be firmly lodged upon the surface of the sleeve, and may even penetrate somewhat beneath the outer surface, experience has demonstrated that the sleeve does not become clogged with sand and other material separated from the liquid. The reason for this, no doubt, lies in the fact that between successive suction impulses, the resilience of the sleeve material causes the sleeve wall to return to its normal state, as shown in Figure 5, and, in so doing, dislodges and throws off any solid material which accumulated thereon.

As can no doubt be appreciated, the minimum wall thickness of the sleeve bears a relationship to the maximum suction produced by the pump for which the filter unit is intended. Oil well pumps upon which the filter unit of this invention is being successfully used, produce a suction of about 25 inches of mercury. These are pumps of average size and average length of stroke. For such pumps, a wall thickness for the sleeve of one-half inch has been found entirely satisfactory, but tests conducted with a sleeve wall thickness of 3/8 of an inch have shown this to be insufficient for good reliable operation. From this observation it is believed that those skilled in the art will be fully able to apply the teachings of the invention.

When the filter unit of this invention was first placed into use on an experimental basis to gain experience, its body did not have the wire mesh screen 20, but instead the filter sleeve directly embraced the perforated tube. In the vast majority of installations where the filter unit was used without the wire mesh screen, its performance was entirely satisfactory. In a few instances, however, where it is believed the sand condition of the well was extremely severe and where the pumps had very long strokes (eight to ten foot strokes for pumps of this type are not uncommon and, in some cases, the length of the stroke greatly exceeds this amount) it was found that the sleeve was drawn so tightly into the holes in the perforated tube, that, in effect, the holes were plugged and liquid could not pass. However, the suction had to be satisfied and, as a result, the sleeve was torn. The wire mesh screen 20, therefore, has been added to guard against such extreme conditions, though in most instances it is not essential to satisfactory operation of the filter unit.

Encircling the filter sleeve is a coil 27 of relatively heavy wire, the convolutions of which preferably are square in cross section. The inside diameter of this coil may be the same as or a trifle greater than the outside diameter of the sleeve when the sleeve is dry, and the space between the convolutions of the coil is quite substantial and preferably at least twice the thickness of each convolution. Accordingly, the presence of the coil does not seriously restrict contact of the liquid with the exterior surface of the sleeve, and for all intents and purposes it may be said that the entire outside surface of the sleeve is directly exposed to the liquid to be pumped. This condition certainly obtains during the suction impulses when the sleeve wall is compacted and its outer surface drawn inwardly, as shown in Figure 4.

Between suction impulses, but of course only when the sleeve is saturated with liquid, the sleeve swells and bulges slightly outwardly between the convolutions of the coil, as shown in Figure 5. The extent to which the sleeve bulges this way depends somewhat upon the viscosity of the liquid, but the fact that the sleeve does bulge out between the convolutions of the coil serves a useful purpose, as will be hereinafter pointed out.

The coil 27 is held centered on the assembly independently of the filter sleeve, by having its endmost convolution received in grooves 28 formed in the shoulders provided by the inner ends of the coupling members. To assure retention of the end coils in the grooves, the free length of the coil is somewhat greater than the distance between the bottoms of these grooves, so that when in place the coil is under slight endwise compression.

As noted hereinbefore, the ends of the filter sleeve also abut the shoulders provided by the inner ends of the coupling members 18 and, of course, unless the ends of the sleeve are held in this position, there is danger of the liquid channeling around the ends of the sleeve and thus defeating the entire purpose of the filter. To assure against such pulling away of the ends of the sleeve and consequent uncovering of adjacent holes 19, the end portions of the sleeve may be cemented, or otherwise adhered to the imperforate end portions of the body. However, it has been found that this expedient is unnecessary since the convolutions of the coil 27 support the sleeve against sagging, even when it is saturated with oil. This support for the sleeve results from the fact that, during the intervals between suction impulses which is the only time the sleeve would be free to sag and move endwise with respect to the tube, parts thereof project between the convolutions of the coil. Hence, the convolutions serve as ledges upon which the sleeve bears and by which the sleeve is supported against sagging throughout its entire length.

The coil 27, therefore, performs a useful function in addition to its obvious purpose of protecting the sleeve against damage during handling of the filter unit and during insertion of the unit into a well and its removal therefrom.

A still further purpose is served by the coil 27. Ordinarily, when the pump is operating satisfactorily, there are no positive pressure impulses within the filter unit. Hence, under such normal operation there is no tendency for the filter sleeve to move away from the screened body which it embraces. However, in the event of faulty operation of the pump causing tardy closure of the check valves, positive pressure within the filter unit may occur. Under such circumstances, if the filter sleeve were not supported as it is by the coil 27, it would balloon away from the body and inevitably become damaged.

From the foregoing description taken with the accompanying drawings, those skilled in this art will have no difficulty recognizing that this invention provides a filter unit exceptionally well adapted for use in oil wells, but not necessarily limited to this use; and that, by virtue of its self-cleaning characteristics and the fact that it assures against penetration of even the finest sand into the pump mechanism, one of the most serious problems of the oil fields is solved by this invention.

What is claimed as my invention is:

1. A self-cleaning filter unit for attachment to the suction pipe of a pump which produces periodic suction impulses to filter suspended solid abrasive particles such as sand from liquid being pumped before such liquid enters the suction pipe, said filter unit comprising: an elongated body member; means on one end of the body member to connect the same to the inlet end of the suction pipe of the pump, said body member being transversely rigid and having means defining flow passages leading from mouths at its sides to said end thereof to permit liquid to be drawn transversely into the body member for flow into the suction pipe; a sleeve of soft yieldable but resilient porous rubber-like foam material embracing the body member and covering the mouths of its flow passages so that liquid must pass through the pores of the sleeve wall to reach the mouths of said flow passages, the outer surface of the sleeve being exposed to have direct contact with the liquid to be pumped so that solid particles suspended in the liquid are separated therefrom and accumulate on the sleeve as liquid is drawn through the pores of the sleeve wall by the suction impulses of the pump manifested inside the sleeve through the flow passages in the body member, the pores of the sleeve wall being uniformly distributed and of a size smaller than sand, the material of which the sleeve is formed having a degree of resilience such that the suction impulses produced by the pump cause the sleeve wall and its pores to contract and thereby more effectively preclude penetration of the solid particles into the sleeve wall under the force of liquid flowing through the pores thereof, and such that during the intervals between suction impulses the sleeve wall returns to its normal thickness to thereby dislodge solid particles from the sleeve, and the sleeve wall having a thickness great enough to assure that the inner portions of the sleeve wall contiguous to the mouths of the flow passages in the body will remain porous to permit flow to the pump even under maximum pump produced suction; and means securing the sleeve against endwise shifting on the body member to thereby assure against uncovering the mouths of any of the flow passages despite a tendency for the sleeve to sag under the weight of liquid filling its pores.

2. A self-cleaning filter unit for attachment to the suction pipe of a pump which produces periodic suction impulses to filter suspended solid abrasive particles such as sand from liquid being pumped before said liquid enters the suction pipe, said filter unit comprising: a rigid elongated tubular body having imperforate end portions; means on one of said end portions for connecting the tubular body to the inlet end of the suction pipe of the pump with the interior of the body in communication with that of the suction pipe, the intermediate portion of the tubular body having perforations which allow free flow of liquid through the wall of the tubular body in response to suction manifested within the tubular body when the other end thereof is closed; a sleeve of soft yieldable but resilient porous rubber-like foam material embracing the entire perforated intermediate portion of the tubular body and through the pores of which liquid must flow to reach the interior of the tubular body, the outer surface of the sleeve being exposed to have direct contact with the liquid to be pumped so that solid particles suspended in the liquid are separated therefrom and accumulate on the sleeve as liquid is drawn through the pores of the sleeve wall by the suction impulses of the pump, the pores of the sleeve wall being uniformly distributed and of a size smaller than sand, the material of which the sleeve is formed having a degree of resilience such that the suction impulses produced by the pump cause the sleeve wall and its pores to contract and thereby more effectively preclude penetration of the solid particles into the sleeve wall under the force of liquid flowing through the pores thereof, and such that during the intervals between suction impulses the sleeve wall returns to its normal thickness to thereby dislodge solid particles from the sleeve, and the sleeve wall having a thickness great enough to assure that the portions thereof overlying the perforations in the tubular body will be only partially compacted by the maximum suction produced by the pump so as to preclude complete collapse of the pores of those portions of the sleeve wall contiguous to the perforations; and means securing the sleeve against endwise shifting on the tubular body to thereby assure against uncovering any of the perforations in the tubular body despite the tendency for the sleeve to sag under the weight of liquid filling its pores.

3. The filter unit of claim 2 further characterized by the provision of a sleeve protecting device comprising: means supportingly engaged with the imperforate end portions of the tubular body and having spaced portions contiguous to and extending along the exterior of the sleeve, said portions being sufficiently rigid to resist deformation thereof radially of the sleeve to thereby confine the sleeve and hold it against ballooning in the event faulty operation of the pump produces pressure impulses within the filter unit.

4. The filter unit of claim 3 wherein said sleeve protecting device comprises a metal coil having helical convolutions encircling the sleeve along its entire length and spaced apart a distance sufficient to assure free flow of liquid to the sleeve.

5. The filter unit of claim 4 wherein the rigid elongated tubular body with its imperforate end portions comprises a perforated metal tube having internally threaded coupling members secured to the ends thereof, the inner ends of said coupling members forming inwardly facing shoulders and having annular grooves therein opening to said shoulders, and wherein the ends of the sleeve and the ends of the coil bear against said shoulders with the ends of the coil being received in said annular grooves so that the coil is held centered independently of the sleeve.

6. In combination: a reciprocating suction pump having a suction pipe in which periodic suction impulses are manifested during operation of the pump; and a self-cleaning filter unit mounted on the inlet end of the suction pipe to separate solid abrasive particles such as sand which may be suspended in the liquid to be pumped from the liquid as it is drawn into the suction pipe by the periodic suction impulses produced by the pump, said filter unit being characterized by a filter element consisting of a wall of soft but resilient porous rubber-like foam material having one side thereof subjected to the suction impulses created by the pump and its other side exposed directly to the liquid to be pumped so that solid particles suspended in the liquid are separated therefrom and accumulate on the filter wall as liquid is drawn through the pores thereof by the suction impulses of the pump, the pores of said filter wall being uniformly distributed and of a size smaller than sand, the material of which the filter wall is formed having a degree of resilience such that the wall contracts in response to suction impulses manifested in the suction pipe by the pump to thereby cause the pores of the wall to decrease in size and more effectively preclude penetration of the solid particles into the wall under the force of liquid flowing through the pores thereof, and such that during the intervals between suction impulses the filter wall returns to its normal thickness and thereby dislodges solid particles therefrom, and the thickness of the filter wall being great enough to assure only partial compaction thereof by the maximum suction produced by the pump so as to preclude complete collapse of the pores of the wall and consequent interruption of liquid flow therethrough.

References Cited in the file of this patent

UNITED STATES PATENTS

| | | |
|---|---|---|
| Re. 18,968 | Willers | Oct. 10, 1933 |
| 679,131 | Thompson | July 23, 1901 |
| 1,148,237 | Kneuper | July 27, 1915 |
| 1,229,437 | Foster | June 12, 1917 |
| 1,256,830 | Rodrigo | Feb. 19, 1918 |
| 1,394,011 | Hills | Oct. 18, 1921 |
| 1,696,313 | Liddell | Dec. 25, 1928 |
| 2,372,669 | Haney et al. | Apr. 3, 1945 |
| 2,514,366 | Beyland | July 11, 1950 |
| 2,530,223 | Breaux | Nov. 14, 1950 |
| 2,582,915 | Sebok | Jan. 15, 1952 |
| 2,646,126 | Goodner | July 21, 1953 |
| 2,668,624 | Wahlin | Feb. 9, 1954 |